US007850080B2

(12) United States Patent
Guillot et al.

(10) Patent No.: US 7,850,080 B2
(45) Date of Patent: Dec. 14, 2010

(54) ASSISTANCE METHOD AND APPARATUS FOR ONLINE PURCHASES OF GOODS OR SERVICES CONDUCTED WITH PAYMENT CARD SYSTEMS

(75) Inventors: Carles Guillot, New York, NY (US); Patrice Peyret, Hillsborough, CA (US)

(73) Assignee: Plastyc, Inc., New York, NY (US)

( * ) Notice: Subject to any disclaimer, the term of this patent is extended or adjusted under 35 U.S.C. 154(b) by 747 days.

(21) Appl. No.: 11/796,003

(22) Filed: Apr. 25, 2007

(65) Prior Publication Data
US 2007/0252002 A1    Nov. 1, 2007

Related U.S. Application Data

(60) Provisional application No. 60/795,769, filed on Apr. 28, 2006.

(51) Int. Cl.
*G06K 15/00* (2006.01)
(52) U.S. Cl. .................. 235/383; 235/379; 235/380; 705/21; 705/39; 902/22
(58) Field of Classification Search .............. 235/383, 235/379; 705/21, 39
See application file for complete search history.

(56) References Cited

U.S. PATENT DOCUMENTS 6,824,049 B2*  11/2004  Lee et al. .................. 235/380

| 2002/0023011 | A1  | 2/2002  | Hatayama |
| 2003/0115137 | A1* | 6/2003  | Rowe ..................... 705/39 |
| 2005/0192832 | A1* | 9/2005  | Call et al. ................ 705/1 |
| 2005/0251470 | A1* | 11/2005 | Sullivan ................ 705/35 |
| 2006/0064376 | A1  | 3/2006  | Ukigawa et al. |
| 2007/0005774 | A1* | 1/2007  | Singh et al. ............. 709/227 |
| 2007/0143230 | A1* | 6/2007  | Narainsamy et al. ...... 705/75 |

OTHER PUBLICATIONS

PCT/US07/10236, Dec. 7, 2007, International Search Report.

* cited by examiner

*Primary Examiner*—Michael G Lee
*Assistant Examiner*—Kristy A Haupt
(74) *Attorney, Agent, or Firm*—DLA Piper LLP (US)

(57) ABSTRACT

A card payment system includes a purchases assistance system linking online merchants of goods or services, including digital goods, with the operator of the card issuance system. Merchants can use the purchases assistance system to seek help from the Issuer for resolving disputes related to purchases of digital goods of which the provisioning may have failed, to trade better commercial terms from the Issuer in exchange for providing details of products purchased by cardholders, to verify the balance of debit cards and request a reservation of funds from the Issuer to lower their financial risks prior to certain types of transactions, or to signal to the Issuer special loyalty rewards associated with specific purchases.

22 Claims, 9 Drawing Sheets

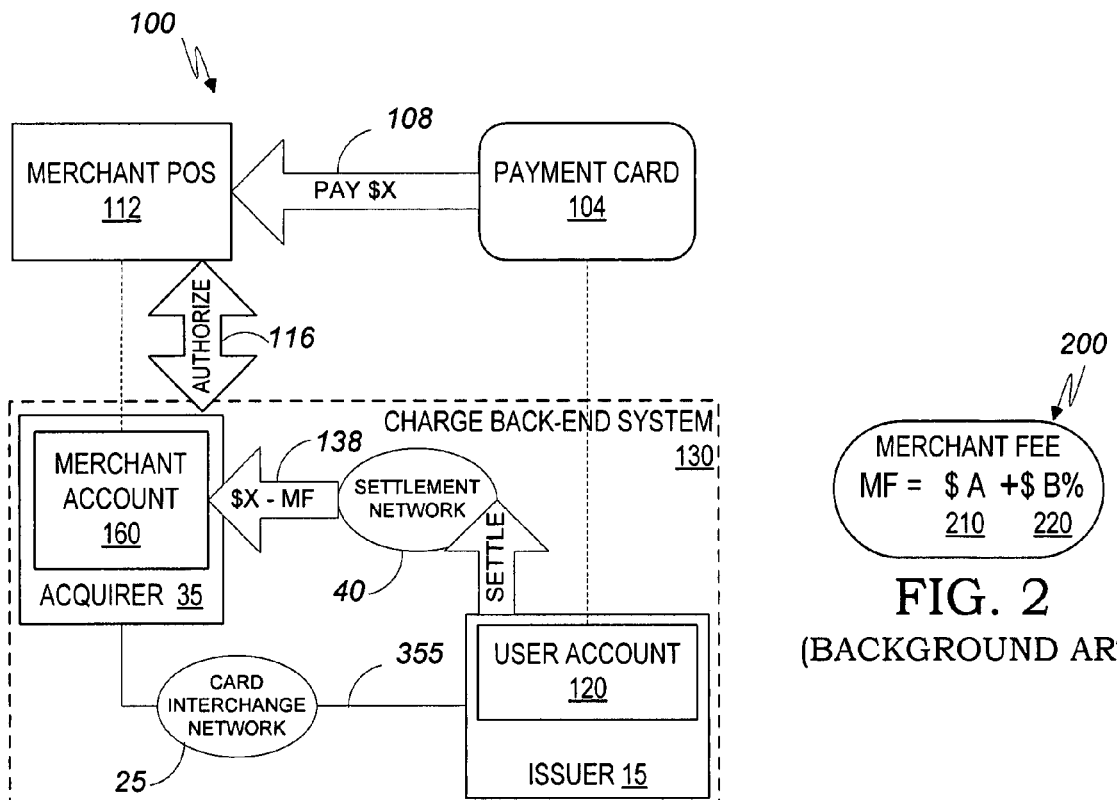
FIG. 1
(BACKGROUND ART)
FIG. 2
(BACKGROUND ART)
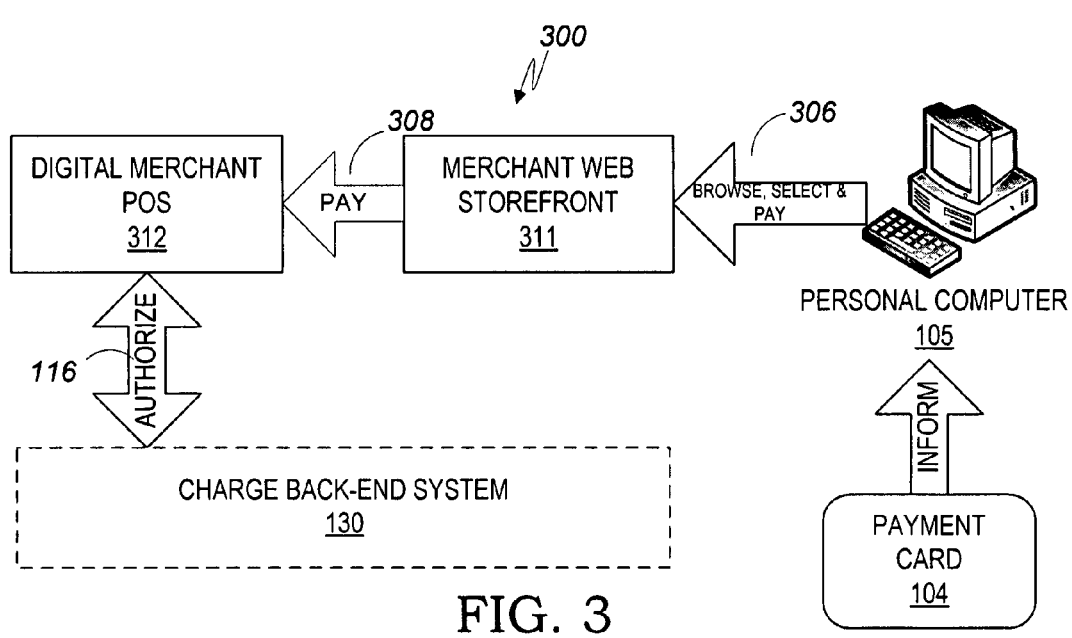
FIG. 3
(BACKGROUND ART)

ASSISTANCE METHOD AND APPARATUS FOR ONLINE PURCHASES OF GOODS OR SERVICES CONDUCTED WITH PAYMENT CARD SYSTEMS

PRIORITY CLAIM/RELATED APPLICATION

This application claims priority under 35 USC 119(e) to U.S. Provisional Patent Application Ser. No. 60/795,769 filed on Apr. 28, 2006 and entitled "Assistance Method and Apparatus for Online Purchases of Goods or Services Conducted With Payment Card Systems", the entirely of which is incorporated herein by reference.

FIELD

A payment system and in particular a card payment systems are provided that are fitted with a method and apparatus for the online purchase of goods or services.

BACKGROUND

Card payment systems are commonplace, allowing users to make payments using a credit or debit card. While credit card charges accumulate debt that the cardholder needs to settle periodically, debit card charges draw money from the funds available in an account. The terms "charge card" or "payment card" will be used herein below to relate to both credit and debit cards.

A charge card is associated with an account that is established with and managed by a card issuer. The card issuer is an entity that manages payments on behalf of the cardholder, and can be a bank, credit card company, telephone company, workplace, school, etc. The charge card is accepted by participating merchants, who sign with a transaction acquirer, which can be the same or other than the card issuer. In a typical transaction, the merchant calculates the payment amount, the cardholder submits his card for payment, the card adequacy to pay is verified by a process called "authorization", the payment particulars are recorded by the merchant's POS (Point Of Service), and then, either in real time or as part of an end-of-day procedure, the transaction records are sent from the merchant to his transaction acquirer for settlement. The transaction is finalized when the transaction acquirer settles with the card issuer (if the issuer is another entity), and funds are transferred to the merchant's account on the one hand, and are charged to the cardholder's account on the other hand. Often the amount transferred to the merchant's account is slightly smaller than the one charged to the cardholder's account, the difference being a fee collected by the issuer, transaction acquirer and/or an interchange network between the transaction acquirer and the issuer.

The charge card is a means for a cardholder to identify his account and authorize transactions therewith. It can have the well-known form factor of a plastic card with embossment and magnetic stripe; it also can be a contact or contact-less smart card having a variety of form factors such as plastic card or a key fob; it also can even be just a record of account details used for performing electronic transactions over the Internet or a cellular network.

FIG. 1 is a schematic block diagram that describes a typical card payment system 100. A payment card 104 related to user account 120 makes a payment transaction 108 in the amount of X dollars with a merchant POS 112. The merchant POS 112 contacts merchant's acquirer 35 for making an authorization 116. The acquirer contacts in turn a card interchange network 25 to obtain the authorization from an issuer 15 via a protocol 355. If the transaction is successfully authorized, the cardholder receives his merchandise or service from the merchant (not shown). The transaction is ultimately completed when the funds transfer 138 of X dollars minus a fee (MF) charged to the merchant is received through settlement network 40 by merchant account 160 associated with POS 112.

Of a special interest are merchants who sell items of small monetary value, for which the fees MF charged by ordinary acquirers of card transactions represent a prohibitively high percentage of the items price. FIG. 2 shows the typical structure of a fee 200 charged to merchants for card payment processing, where the merchant fee MF is comprised of a fixed amount 210 to which a percentage amount 220 of the purchase amount is added. Typical fees 200 are devised to represent an acceptable overall percentage of most common card transactions, for example 2.5% or less. However, when the price of the good or service being sold is small, the fee incurred by the merchant accepting the card as a payment instrument can be in excess of 10% of the value of the transaction because the fixed factor 210 becomes preponderant, thus making card payments non viable for small-ticket low-margin commerce. For example, it is customary that fixed factor 210 be in the vicinity of $0.25, thus representing 25% of a $1 transaction. It should be noted that the fee MF charged to the merchant is intended to cover all the service costs incurred by the participants of charge back-end system 130 of FIG. 1, i.e. the acquirer, interchange network and issuer, and not just the acquirer.

Costs incurred by merchants for ordinary card transactions are even higher for online merchants which sell goods and services over an Internet storefront, because the transactions are deemed to be "card-non-present-transactions", which are typically riskier than "card-present-transactions" at a physical retail Point Of Service. During a card-present-transaction, the merchant is given the opportunity to verify by itself a number of credentials about the card holder, such as that the matching of the signature at the back of the card against the card-holder's signature on a paper receipt, or the matching of the name printed on the face of the card against a requested card-holder proof-of-identity. Such verifications by the merchant are not available during an online purchase, thus increasing the risk that the card involved may not be legitimate or may have been stolen. Hence, transaction acquirers typically charge merchants a higher fee for such card-non-present-transactions, by increasing the percentage amount 220, and sometimes the fixed amount 210 as well.

FIG. 3 is a schematic block diagram that describes a typical card-non-present payment system 300. A personal computer 105 is used to browse and select a desirable good or service from a merchant's web storefront server 311, where the personal computer and the merchant server communicate remotely with each other via a known Internet protocol 306. Once the desired good or service is selected, a payment card 104 on the personal computer side makes a payment transaction 308 with a merchant POS 312 via the merchant storefront 311. The merchant POS 312 contacts a charge back-end system 130 for making an authorization 116 which is considered a card-non-present authorization. If the transaction is successfully authorized, the cardholder receives his merchandise or service from the merchant (not shown). Online merchants of small-value digital items like digital music, ring-tones for Mobile Phones or casual video games for Personal Computers or Game Consoles or Mobile Phones are thus doubly impacted by card fees: once because the fees amount to a naturally high percentage of the price of their wares, and a second time because they sell through card-non-present transactions which have a higher fee associated with them.

Some of the most sophisticated online merchants of digital goods implement methods and processes to alleviate the onerous fee structure of typical card payment systems by attempting the aggregation of a multiplicity of small-amount transactions within a given period of time (e.g. a few days). FIG. 4 illustrates a typical aggregation system 400 where a series of consecutive small-amount transactions are lumped together "behind the scenes" by a merchant POS 412 into a single larger-value transaction, which is then processed by an ordinary charge back-end system. In this way, the fee is incurred on the cumulative value of the plurality of small transactions, and in particular the fixed factor 210 of FIG. 2 is incurred only once.

Besides being financially impacted by the current cost structure of card payment systems, online merchants of digital items are also encumbered by high failure rates in the telecommunication-based fulfillment of the goods they sell. Digital items are typically sent from a merchants' computer-based server and storage system to the purchaser via shared and public telecommunication links such as phone lines, broadband cables, or wireless cells reaching a purchaser's device such as a personal computer, set-top box, game console or mobile phone. FIG. 5 is a schematic block diagram that describes a typical digital goods delivery system 500. A digital item is downloaded through the public Internet 309 via a communication protocol 307 from the Merchant's 110 to the Personal Computer 105 of the purchaser. All elements involved in the delivery of the digital goods, i.e. the merchant's server system sending the goods, the purchaser's device receiving the goods and the telecommunication system transporting the goods, are prone to technical failures, resulting in the unsuccessful fulfillment of the purchased digital goods. Examples of such failures include interruptions of the telecommunication links, corruption of the data during transfer due to noise or interferences, erroneous labeling of item references on the merchant server, lack of available memory space in the purchaser's device. The failure rates are much higher than during the fulfillment process of physical goods such as the delivery of a cinema ticket, the bagging and transporting of groceries, or the selection of a book from a store shelf. Therefore, merchants of digital goods are often confronted with complaints from customers having failed to properly receive the digital goods already selected, ordered and purchased by the customer.

Some of the most sophisticated online merchants of digital goods implement methods and processes to reduce the risk of fulfillment failures by implementing disruption-tolerant end-to-end communication protocols between their download servers and the purchasers' devices. Such resilient protocols typically allow purchasers to recover from an interruption, but they tend to be limited to high-end programmable devices like personal computers, and require a certain degree of technical sophistication from the purchaser.

These typical systems and methods, however, have limitations and drawbacks. First, the merchants implementing an aggregation method to reduce their fees incur a risk of not being paid as long as the cumulative amount of transactions has not reached the threshold for triggering an authorization request to the charge back-end system. This is particularly true when the payers are teenagers equipped with prepaid or debit cards rather than adults with a credit card. Teen prepaid or debit cards usually carry a small balance and transactions on such cards are only authorized on the basis of the balance amount and not the estimated credit-worthiness of the holder. Therefore, the merchants run a higher risk to see the transactions being declined when the aggregated amounts to be obtained from such cards are presented to the payment network. This holds true even if an authorization request was performed prior to the user starting to make purchases, as, in the mean time, the balance on the prepaid or debit card may have decreased through purchases elsewhere, below the value of the aggregated amount submitted to the network.

A second drawback is that the issuers of payment cards are usually the first entity called by purchasers if a transaction listed on their card statement is in dispute. If the problem relative to a digital good purchase is due to a fulfillment problem, then the card issuer is powerless because he is unaware of the fulfillment process and possible shortcomings or improvements of that process, and needs to refer the cardholder back to the merchant. Furthermore, if the transaction in dispute is one of a series of transactions having been aggregated by the merchant for cost-optimization purposes, then the cardholder and the issuer cannot even determine which part of the aggregated transaction may be at fault.

SUMMARY

A method and apparatus for improving the online card payment of goods, including digital goods is provided. The system lowers the financial risks incurred by merchants who attempt to aggregate small-amount transactions before requesting a card payment authorization, including in those cases where the card is a prepaid debit card with an expected low balance. The system also allows the card issuer to investigate potential digital content fulfillment failures when a cardholder disputes such a transaction, including in those cases where the incriminated transaction is part of an aggregation by the merchant of successive small-amount transactions. The system also permits merchants to negotiate financially advantageous transaction processing prices with the card issuers by selectively providing to such issuers commercially-useful details about the purchased products or services which would not otherwise be available through the processing protocols of the prior art, in exchange for a discount on interchange fees. The system does not require any modification to the existing protocols used by merchants, acquirers, payment networks and issuers.

BRIEF DESCRIPTION OF THE DRAWINGS

FIG. 1 is a simplified block diagram describing a typical card payment system;

FIG. 2 is a description of a typical merchant fee structure;

FIG. 3 is a simplified block diagram describing a typical card-non-present online transaction architecture;

DETAILED DESCRIPTION

Figure 4:
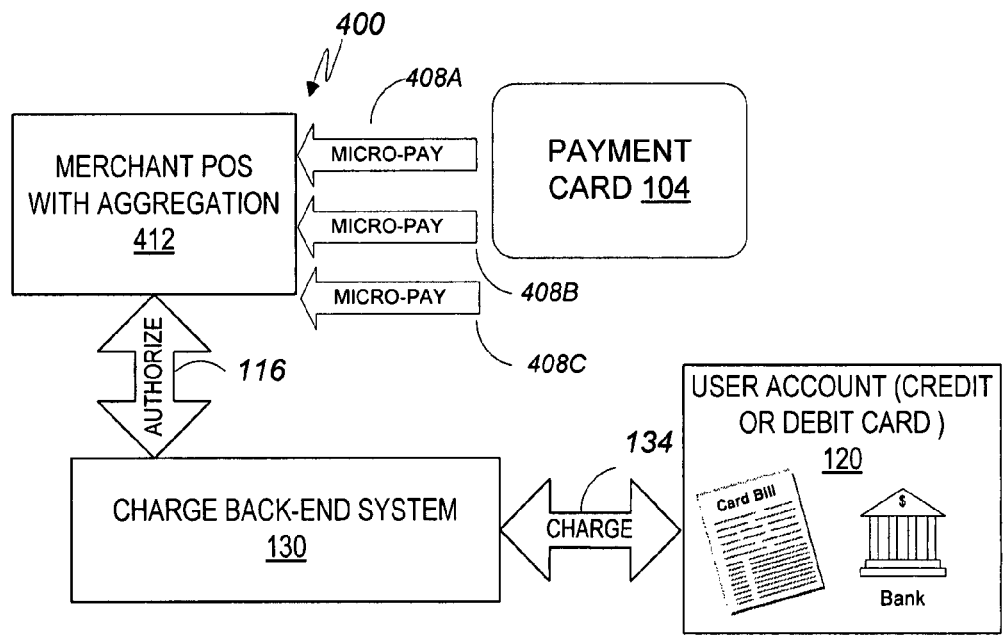
FIG. 4 is a simplified block diagram describing a typical transaction aggregation system implemented by a merchant.
Figure 5:
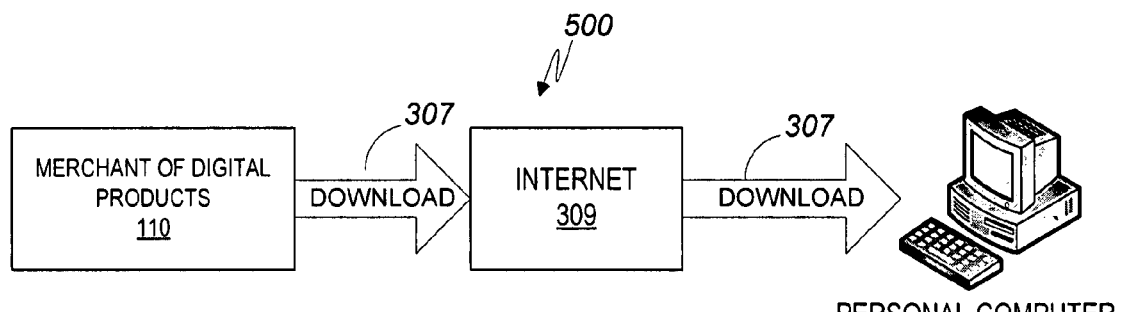
FIG. 5 is a simplified block diagram describing the typical download path of digital product being purchased online.
Figure 6:
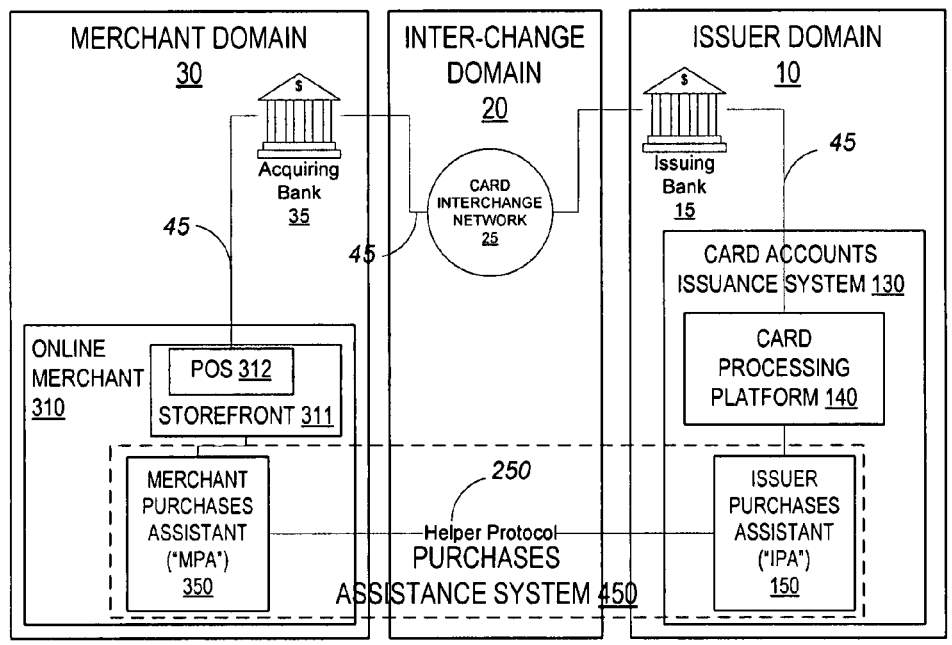
FIG. 6 is a simplified block diagram of a purchases assistance system.

A purchase assistance system 450 between one or more merchants 310 of products or services selling, among other things, small-value items, and one or more charge card account issuance systems 120 is provided as shown in FIG. 6. The overall system may include a merchant domain 30, an interchange domain 20, and an issuer domain 10. Card payments made at a merchant 310 are authorized via a typical protocol 45 between an acquirer 35 and an issuer 15 via an interchange network 25. The protocol may be ISO 8583 that is independent of the presence or the absence of purchase assistance system 450 since the purchase assistance system 450 does not require the protocols of the typical charge card system to be altered in order to be used with the purchase assistance system.

The purchases assistance (PA) system 450 may include a merchant purchase assistant unit 350 associated with each merchant 310 and an issuer purchase assistant unit 150 associated with each issuer 130 wherein the units 350, 150 each have a plurality of lines of computer code, executed by a computing device associated with the merchant and issuer, respectively, that perform the functions and operations of each of these units as described in more detail below. The merchant purchase unit 350 links the merchant to the same issuer 15, but through a data exchange helper protocol 250 running in parallel with protocol 45, between merchant purchase unit 350 and the issuer purchase unit 150. The data exchange helper protocol 250 does not carry payment authorization transactions, which are solely conducted via protocol 45, such as ISO 8583. Instead, data exchange helper protocol 250 handles a series of optional assistance features related to the purchases of goods or services including digital goods. Thus, the dedicated data exchange helper protocol 250 allows the merchant purchase assistant 350 and the issuer purchase assistant unit 150 to communicate with each other either in batch mode at regular intervals or in real-time asynchronous mode. The data exchange helper protocol 250 never carries payment authorizations. With reference to Table 1, the data exchange helper protocol 250 can carry a combination of one or more of the following: card holder identification data elements; purchase transaction data elements; reward program transaction data elements; card balance and reservation request data; administrative commands; card identification data elements; and/or card-holder authentication request commands.

The card-holder identification data elements allow the issuance system 120 to determine which card-holder is carrying out purchase transactions that may require assistance through the Purchase assistance system 450. The purchase transaction data elements including product genre or product identification such as, by way of example, title, track name, level name, chapter name, etc. that can be further used by the Issuer to identify unambiguously digital purchases that may be at fault during a failed fulfillment or erroneous charge, or to warehouse for later commercial analysis, if the merchant agrees to such exploitation of these data elements, for example in exchange for a discount on the interchange rate. The reward program transaction data elements allow, by way of example, a particular transaction to be rewarded with a number of loyalty points different from what the default rules for the loyalty program would otherwise allocate. The data elements representing the card balance and reservation-request amount allow the merchant 310 to verify the amount of funds available from a card-holder and to request that a portion of such amount be reserved for its use, prior to the merchant attempting to aggregate transactions for fee optimization purposes. The various administrative commands allow the merchant purchase unit 350 and the Issuer purchase unit 150 to inform each other of various operational states, enter into specific modes of operations and otherwise stay synchronized. The card identification data elements allow a merchant 310 to provision in its online wallet system those cards that can subsequently benefit from the Purchase Assistance because they are issued by an Issuer equipped with Issuer Purchase Assistance 150. Such feature can be found, by way of example, in the typical Amazon.com system where Visa Amazon cards get provisioned automatically inside the Amazon storefront's wallets once issued. The card-holder authentication request commands allow the merchant 310 to delegate to the issuance system 120 the online authentication of the card-holders and thus reduce the risk of later transaction repudiation by such card-holders. Such feature can be found, by way of example, in the typical Verified-by-Visa and MasterCard Securecode systems.

Figure 7:
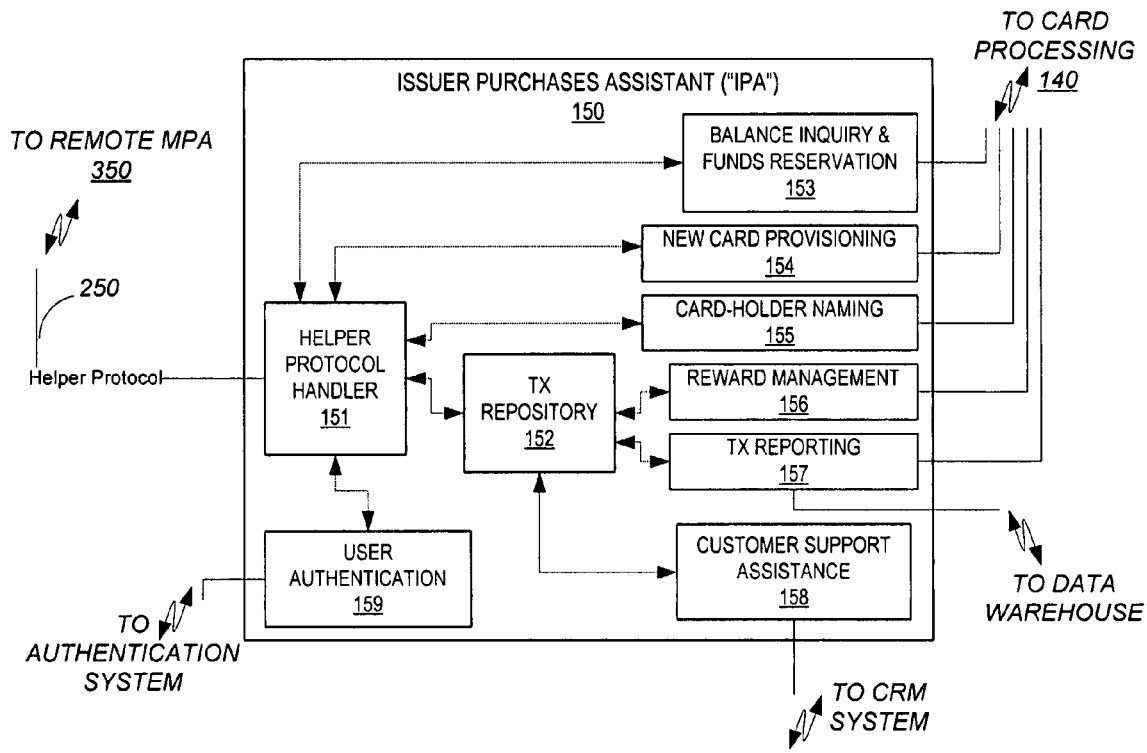
FIG. 7 is a simplified diagram showing more details of an issuer purchase assistant of the purchases assistance system shown in FIG. 6.

The assistance features provided by the PA system 450 is described with reference to FIG. 7 which depicts schematically the internal modules of the issuer purchase unit 150 ("IPA"). The unit 150 may include a data exchange helper protocol handler 151 that receives and sends information from and to the data exchange helper protocol 250, parses, dispatches and receives relevant data to and from the other modules of the Issuer PA. A module 152 is a data repository that stores the details of purchase transactions sent by the merchant 310. A module 153 handles the real-time verification of accounts balances and the reservation of funds in such accounts by communicating with a card processing platform 140 shown in FIG. 6. A module 154 also communicates with the card processing platform 140 and handles the provisioning of new or updated card account information back to merchant 310. A module 155 is in charge of resolving different user-identification syntax conventions used respectively by merchant 310 and the card processing platform 140, so that each party can keep using its own proprietary name space while enabling the Issuer PA to unambiguously handle individual users. By way of example, the issuer system 130 can identify its cardholders with Payment Application User Identifiers data elements or "PA_ID's", managed by the module 155. A module 156 handles the management of reward events requested by merchant 310 and destined to card processing platform 140. A module 157 handles the synchronization of the reporting of purchase transactions coming from the merchant 310 with the reporting of transactions handled by card processing platform 140. A module 158 passes relevant data elements about purchase transactions to a Customer Relation Management system, in particular to assist with possible disputes on such transactions. A module 159 handles user online authentication request from the Merchant 310 wishing to delegate such authentication to the Issuer. In an exemplary implementation, each module described above may be implemented as one or more lines of computer code on a computing device of the merchant that implement the functions and operations of the module as described herein.

Figure 8:
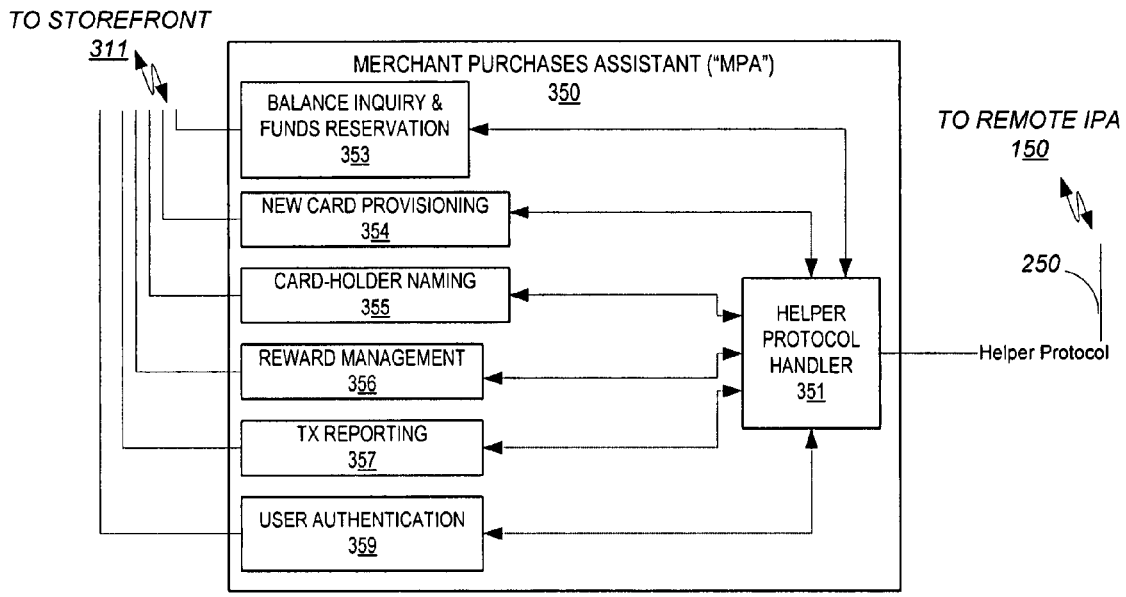
FIG. 8 is a simplified diagram showing more details of a merchant purchase assistant of the purchases assistance system shown in FIG. 6.

Symmetrically, FIG. 8 depicts the internal modules of merchant purchase unit 350 ("MPA"). In an exemplary implementation, each module described above may be implemented as one or more lines of computer code on a computing device of the merchant that implement the functions and operations of the module as described herein. A data exchange helper protocol handler 351 sends and receives information to and from the data exchange helper protocol 250, collects, parses and dispatches relevant data elements from and to the other modules of the Merchant purchase. A module 353 receives requests for the real-time verification of accounts balances and the reservation of funds in such accounts from merchant storefront 311. A module 354 also communicates with merchant storefront 311, and handles the provisioning of new or updated card account information received from the Issuer. A module 355 is in charge of resolving different naming convention used respectively by merchant 310 and the card processing platform 140, so that each party can keep using its own proprietary name space while enabling the Merchant purchase unit to unambiguously handle individual users. By way of example, merchant 310 can identify its customers with its own Merchant Application User Identifiers data elements or "MA_ID's" managed by the module 355. A module 356 handles the management of reward events requested by storefront 311 and destined to card processing platform 140. A module 357 provides the details of purchase transactions coming from the merchant storefront 311 and destined to Issuer PA 150. A module 359 handles user online authentication requests from the merchant storefront 311 and delegates such authentication to the Issuer via data exchange helper protocol 250 and the Issuer PA 150.

Figure 9:
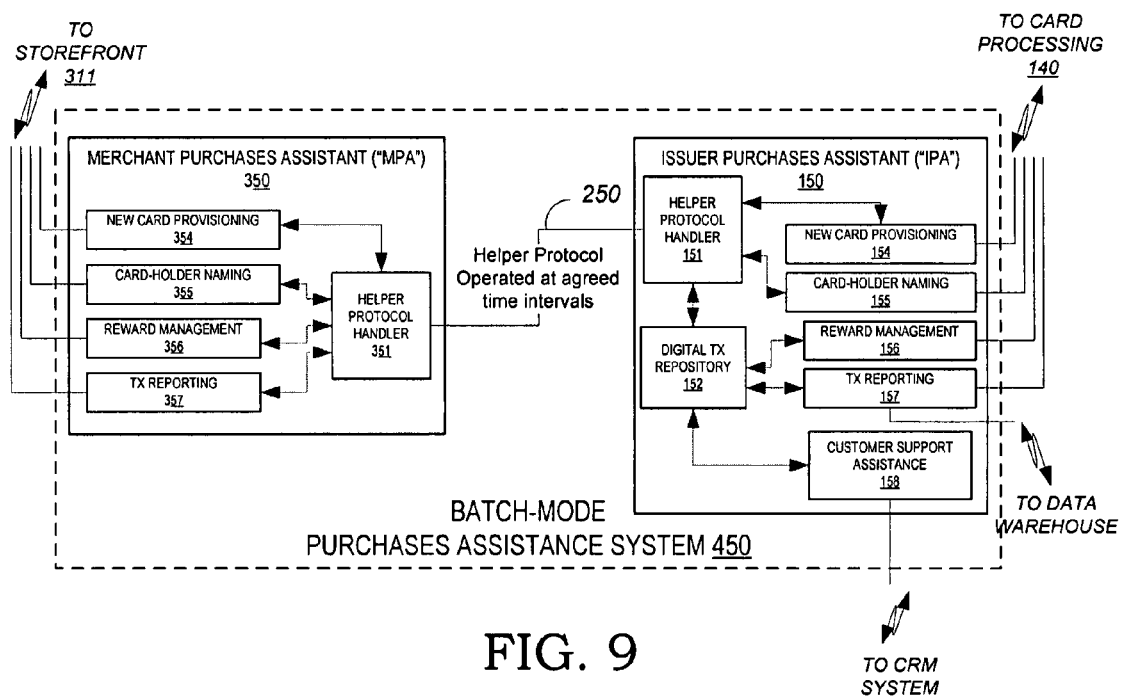
FIG. 9 is a simplified diagram illustrating another embodiment of the purchase assistance system operating in batch mode.

With reference to FIG. 9, in one embodiment of the system, the Merchant purchase unit 350 and the Issuer PA 150 can operate only in batch mode, i.e. at regular intervals agreed upon between the merchant 310 and the issuer system 130, for example every 24 hours at the end of the business day. In such an implementation, modules 353 and 153 for handling balance inquiry and reservation of funds, and modules 159 and 359 for handling delegated user authentication, are not present because a merchant 310 cannot request the issuer 130 to authenticate a cardholder on its behalf nor to verify a card balance and reserve funds. The provisioning of new cards into the merchant's wallet system through modules 154, 155, 354 and 355 is done synchronously at agreed upon intervals, with the consequence that a new card issued to a new consumer will not appear inside the merchant's system until for example the next business day. The delivery of transactions details and special rewards requests is also done synchronously at agreed upon intervals, with the consequence that purchase details and associated loyalty rewards will not appear inside the cardholder's account until for example the next business day. While such batch-mode implementation has the limitations described above, it has the benefit of being easier to deploy for merchants, as it places no real-time constraints on the merchants' systems.

Figure 10:
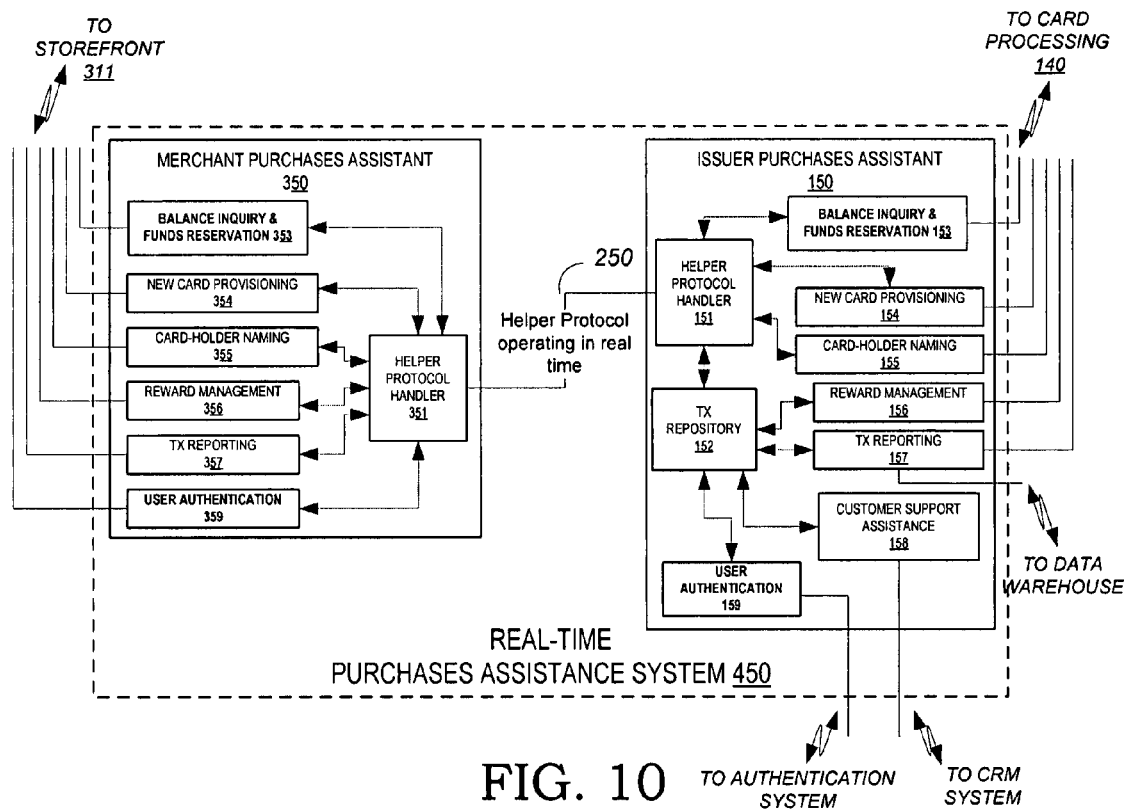
FIG. 10 is a simplified diagram illustrating another embodiment of the purchase assistance system operating in a real-time mode.

Alternatively, in another embodiment of the system shown in FIG. 10, the Merchant purchase unit 350 and the Issuer PA 150 can operate in real-time, i.e. whenever the need arises for the merchant and the issuer to communicate. In such an implementation, all modules can be present as needed. In particular, the merchant 310 can request the issuer 130 to authenticate a cardholder on its behalf and to verify a card balance and reserve funds before attempting an aggregation of subsequent transactions.

Figure 11:
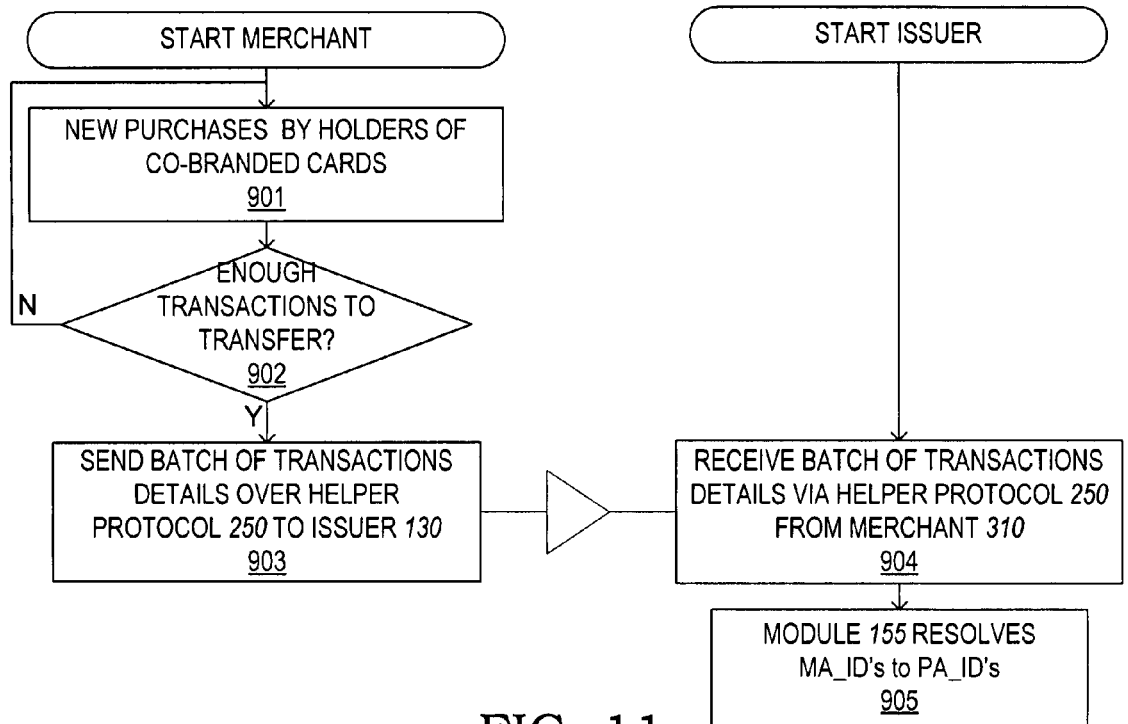
FIG. 11 is a flowchart illustrating how a merchant uses the purchase assistance system to deliver data representing the details of purchase transactions, including product identification.

A first assistance function of the purchase assistance system is to enable merchants 310 to obtain better customer support from the issuer 130 for purchases of goods carried out by cardholders at the merchant's online storefront. Since disputes relative to purchases of digital goods often arise out of a delivery failure of such goods rather than a faulty payment transaction, it is beneficial for the issuer 130 who is likely to be the first responder to cardholder inquiries about disputable transactions, to have the details of which exact digital product was purchased by whom, instead of just knowing the monetary amounts spent by cardholders for what may amount to a succession of separate downloads of digital content all aggregated into in financial transaction. Using the Purchase Assistant and in particular modules 152, 155 and 157 inside the Issuer PA 150 and modules 355 and 357 inside the Merchant purchase unit 350, the merchant 310 can send to issuer 130 the detailed data elements representing previous transactions relative to purchase by the multiplicity of holders of cards issued by Issuer 130. This is illustrated in the flowchart of FIG. 11. Such sending of transactions details need not be done in real-time, and can be carried out at agreed upon intervals between the merchant and the issuer.

A second function of the purchase assistance system is to enable merchants 310 to obtain cheaper merchant fees for purchases of low-priced goods carried out by cardholders at the merchant's online storefront. One way of achieving lower fees is for issuer 130 to refund part or all of its share of the interchange fees to merchants 310 in exchange for obtaining from merchants 310 data elements detailing which products were purchased by whom. Product details relative to goods typically yield interesting personality traits information such as behavior, lifestyle and areas of interest about their purchasers. Such personality traits information can subsequently be used by issuer 130 in an anonymous manner to create cardholder profiles and categories and assist other merchants than merchants 310 to create product offers to cardholders as a function of their profile. Since such assistance to other merchants can be monetized by issuer 130, it can afford to give up part or all of the interchange fees received from merchants 310. Using the Purchase Assistant and in particular modules 152, 155 and 157 inside the Issuer PA 150 and modules 355 and 357 inside the Merchant purchase unit 350, the merchant 310 can send to issuer 130 the details of previous transactions relative to purchase by the multiplicity of holders of cards issued by issuer 130. This is illustrated in the flowchart of FIG. 11. Such sending of transactions details need not be done in real-time, and can be carried out at agreed upon intervals between the Merchant and the Issuer.

Figure 12:
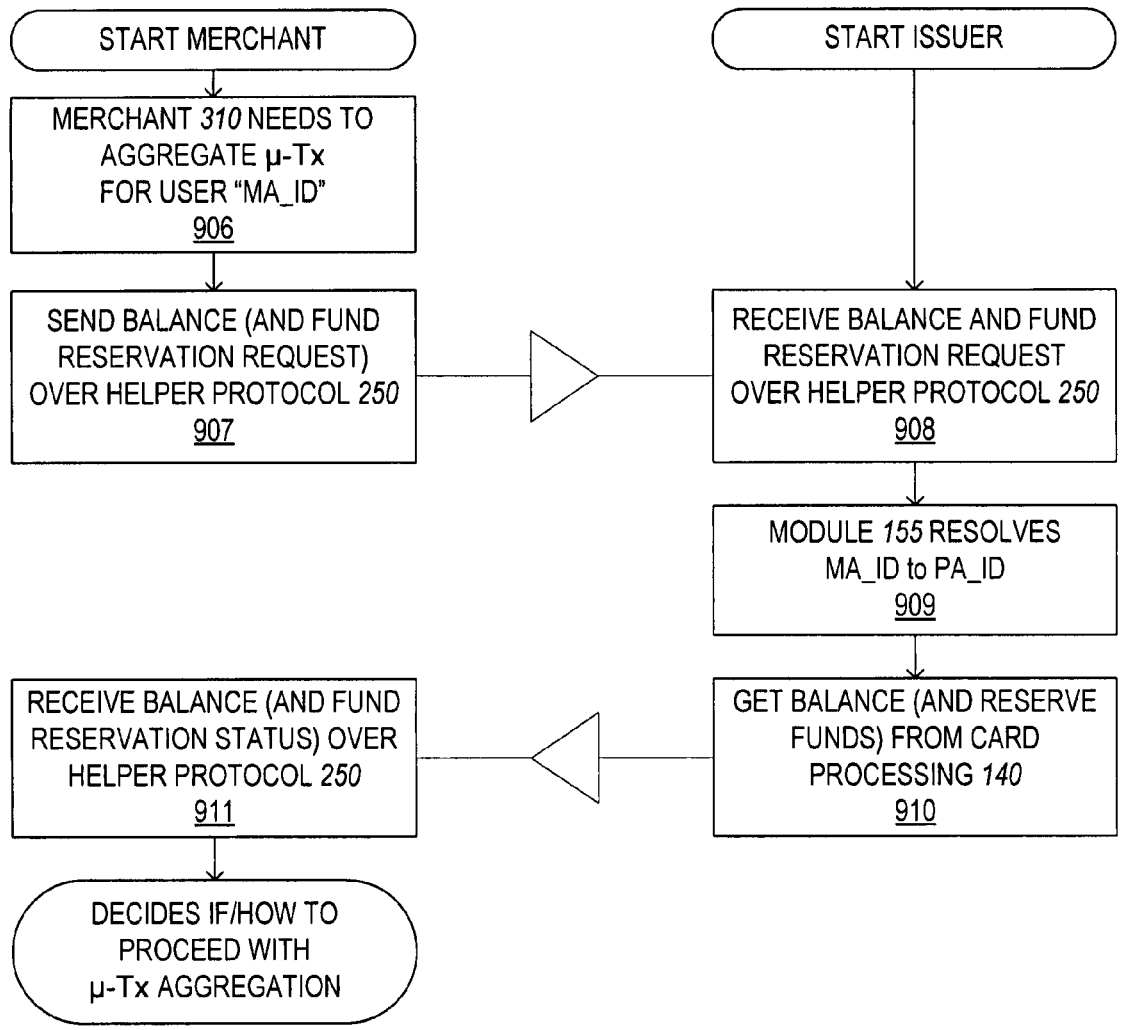
FIG. 12 is a flowchart illustrating how a merchant uses the purchase assistance system to obtain data representing balance checks and funds reservation.

A third function of the purchase assistance system is to enable merchants 310 to reduce the financial risk of aggregating small transactions before requesting an amalgamated payment authorization through the card interchange networks of the background art, in particular when the card presented by a purchaser is a debit card rather than a credit card. Using the Purchase Assistant and in particular modules 153 and 155 inside the Issuer PA 150 and modules 353 and 355 inside the Merchant purchase unit 350, the merchant 310 can send to issuer 130 a request to obtain the current remaining balance in the payment card of a particular named user for whom merchant 310 would like to start an aggregation cycle. Merchant 310 can also optionally request that a certain amount of funds inside the user's card balance be pre-reserved for its use during a certain period of time. This is illustrated in the flowchart of FIG. 12. Such balance checks and funds reservation requests need to be done in real-time.

Figure 13:
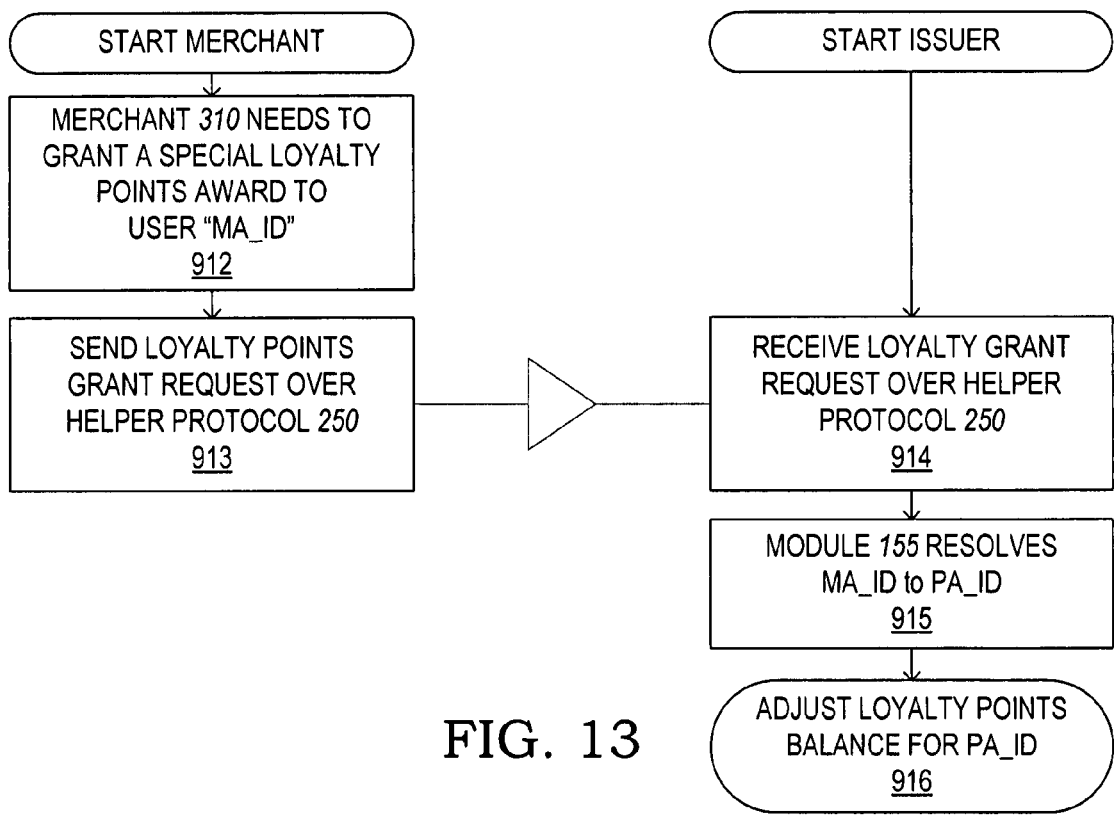
FIG. 13 is a flowchart illustrating how a merchant uses the purchase assistance system to exchange data with an issuance system 130.

A fourth function of the purchase assistance system is to enable merchants 310 to grant special awards to purchasers for certain transactions, where the special awards supersede the default rules that the loyalty program may otherwise allocate. By way of example, the purchase of a given item during a certain period of time may be awarded double the number of loyalty points than usual. Using the Purchase Assistant and in particular modules 155 and 156 inside the Issuer PA 150 and modules 355 and 356 inside the Merchant purchase unit 350, the merchant 310 can send to issuer 130 a request to grant a number of loyalty points to a particular named user and for a particular transaction for which merchant 310 would like to provide an exceptional reward. This is illustrated in the flowchart of FIG. 13. Such sending of loyalty points grant requests need not be done in real-time, and can be carried out at agreed upon intervals between the Merchant and the Issuer.

Figure 14:
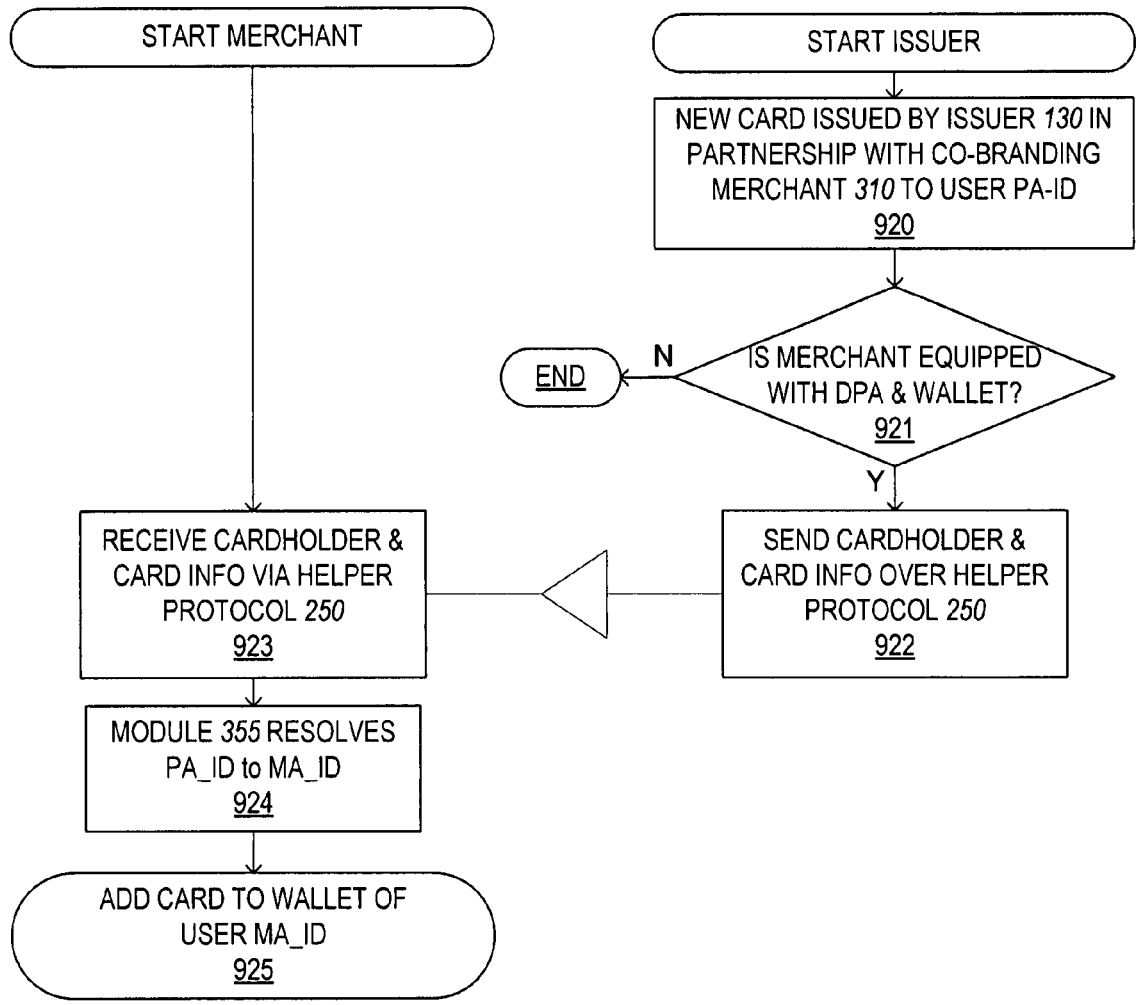
FIG. 14 is a flowchart illustrating how the issuing system uses the purchase assistance system to provision new or updated card information into the wallet of co-branding merchants.

A fifth function of the purchase assistance system (that may also be provided by typical systems), is to enable merchants 310 to collaborate more efficiently with the issuer 130 to issue co-branded payment cards, which are cards bearing some distinctive logo or graphics of merchant 310 and carrying some cardholder benefits when used for purchases at such merchant, such as, by way of example, the earning of loyalty points which can be later redeemed against free or discounted goods or services. To make such co-branded cards easier to select and to use when cardholders visit the merchant's online store, it is customary in the background art for merchants to implement a wallet system, which is a secure repository of the cardholder's card details, avoiding the need for the cardholder to repeatedly input its card details before a purchase. While populating such merchant wallet system with the details of a new card can always be done manually by the cardholder during his or her first visit to the online store of the merchant, it would be advantageous to enable the automatic provisioning of co-branded cards into the wallet system as soon as the issuer has validly issued such a card to a cardholder. Using the Purchase Assistant and in particular module 154 inside the Issuer PA 150 and module 354 inside the Merchant purchase unit 350, the issuer 130 can send to merchant 310 the required cardholder and card details information via the data exchange helper protocol 250 if the merchant is suitably equipped with a wallet system. This is illustrated in the flowchart of FIG. 14. Such sending of card provisioning requests need not be done in real-time, and can be carried out at agreed upon intervals between the Merchant and the Issuer.

Figure 15:
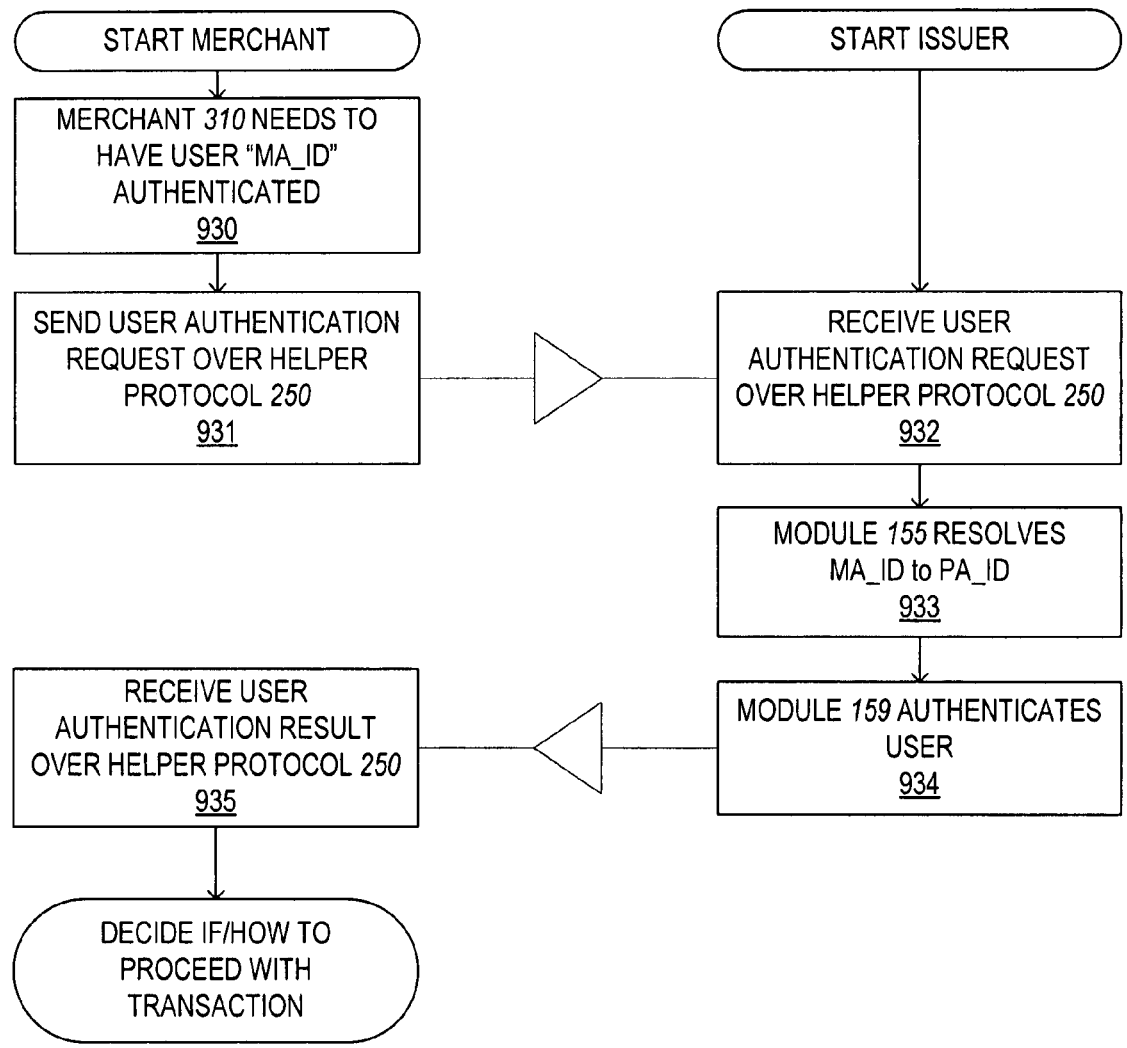
FIG. 15 is a flowchart illustrating how a merchant uses the purchase assistance system to delegate online user authentication to an issuer.

A sixth function of the purchase assistance system (that may also be provided by typical systems) is to enable merchants 310 to reduce the risk of transactions repudiations by delegating back to the issuer 130 the task of authenticating online users. Using the Purchase Assistant and in particular modules 155 and 159 inside the Issuer PA 150 and modules 355 and 359 inside the Merchant purchase unit 350, the merchant 310 can send to issuer 130 a request to authenticate a particular named user with whom the merchant 310 is about to carry out a transaction. This is illustrated in the flowchart of FIG. 15. Such delegated user authentication needs to be done in real-time.

While the foregoing has been with reference to particular embodiments of the system and method, it will be appreciated by those skilled in the art that changes in this embodiment may be made without departing from the principles and spirit of the system and method, the scope of which is defined by the appended claims.

TABLE 1

| DATA ELEMENT | PURPOSE |
| --- | --- |
| CARD-HOLDER IDENTIFIER | Identify a payer with a card able to use the benefits of the helper protocol |
| CARD IDENTIFICATION DATA | Identify a card used for purchases, possibly co-branded by the merchant |
| ISSUER ACTION CODE | Define the action to be undertaken by the IPA |
| MERCHANT ACTION CODE | Define the action to be undertaken by the MPA |
| MERCHANT IDENTIFIER | Identify the Merchant uniquely |
| MPA CAPABILITIES | Provide the capabilities of the MPA |
| IPA CAPABILITIES | Provide the capabilities of the IPA |
| AMOUNT OF TRANSACTION | Define the amount of the purchase |
| DATE & TIME LOCAL TRANSACTION | Define the date & time of the transaction |
| TRANSACTION LIFE_CYCLE ID CODE | Identify a transaction thread un-ambiguously |
| ITEM DESCRIPTOR | Describe the Item being purchased |
| ITEM PRODUCT/GENRE CODE | Determine the genre of good/service purchased |
| ITEM UNIT OF MEASURE | Define how the quantities of Items are measured |
| ITEM PRODUCT QUANTITY | Provide the quantity of items being purchased |
| ACCOUNT BALANCE | Provide the balance of the card account |
| FUNDS RESERVATION AMOUNT | Provide the amount of funds to be reserved in a card account |
| CARDHOLDER AUTH. RESULT | Provide the result of a cardholder authentication by the Issuer |
| REWARD POINTS AMOUNT FOR TX | Define the number of points to be awarded for a transaction, superseding the default award rule |

The invention claimed is:

1. An electronic communication protocol between an issuer of payments cards and merchants accepting the cards of the issuer for purchases of goods and services by consumers, the communication protocol comprising:
    establishing a data exchange helper protocol between the merchant and the issuer, separate from the data communication channel and protocol used for authorization and settlement of card payments; and
    transferring, periodically from the merchant to the issuer, over the data exchange helper protocol, a plurality of data elements representing a portion of the products purchased by consumers using a payment cards issued by the issuer.

2. The protocol of claim 1, wherein the plurality of data elements represent all of the products purchased by consumers using a payment cards issued by the issuer.

3. The electronic communication protocol of claim 1, wherein the plurality of data elements further comprise a set of data about a prior download of digital goods where the prior download originated at an online storefront of the merchant and terminated at a computing device of the consumer capable of consuming or storing the digital goods.

4. The electronic communication protocol of claim 1 further comprising determining, by the issuer using the plurality of data elements, a behavioral model of one or more consumers using a payment card issued by the issuer.

5. The electronic communication protocol of claim 1 further comprising determining, by the issuer using the plurality of data elements, a monetary value of the interchange fees received for the purchases of good by consumers using a payment card issued by the issuer and apportioning the monetary value to the merchants that sold the good to the consumers using a payment card issued by the issuer.

6. The electronic communication protocol of claim 5, wherein apportioning the monetary value further comprises reimbursing the monetary value to the merchants that sold the good to the consumers using a payment card issued by the issuer.

7. The electronic communication protocol of claim 5, wherein apportioning the monetary value further comprises using the monetary value to purchase reward items from the merchants that sold the good to the consumers using a payment card issued by the issuer.

8. The electronic communication protocol of claim 1, wherein the plurality of data elements further comprise one or more data elements identifying a specific purchase that is eligible for a loyalty reward.

9. The electronic communication protocol of claim 8, wherein the plurality of data elements identifying the specific purchase further comprise an amount and origin of the loyalty reward.

10. The method of claim 1, wherein the data exchange helper protocol does not carry payment authorizations.

11. An electronic communication protocol between an issuer of payments cards and merchants accepting the cards of the issuer for purchases of goods and services by consumers, the communication protocol comprising:
    establishing a data exchange helper protocol between the merchant and the issuer, separate from the data communication channel and protocol used for authorization and settlement of card payments; and
    transferring, upon request by the merchant when a cardholder wishes to make a purchase with a debit card of the issuer and over the data exchange helper protocol, a plurality of data elements representing an inquiry command to obtain the current balance of that debit card.

12. The electronic communication protocol of claim 11 further comprising transmitting, by the merchant, a debit card balance verification request prior to attempting the aggregation of multiple transactions prior to seeking a debit authorization from the issuer.

13. The electronic communication protocol of claim 11, wherein the data elements representing the debit card balance inquiry commands further comprises one or more data elements specifying a monetary amount to be reserved by the issuer in the account of the cardholder for a certain period of time.

14. The method of claim 11, wherein the data exchange helper protocol does not carry payment authorizations.

15. An electronic transaction system between an issuer of payments cards and merchants accepting the cards of the issuer for purchases of goods and services by consumers, the system comprising:
    a merchant purchase assistance unit;
    an issuer purchase assistance unit capable of being in communication with the merchant purchase assistance unit using a data exchange helper protocol that is separate from a communications channel and protocol used for authorization and settlement of card payments between the merchant and the issuer; and
    the merchant purchase assistance unit further comprising a module that gathers information about one or more purchases at the merchant by one or more consumers that purchased products using a payment cards issued by the issuer and a module that transfers, periodically from the merchant to the issuer, over the data exchange helper protocol, a plurality of data elements representing a portion of the products purchased at the merchant by consumers using payment cards issued by the issuer.

16. The system of claim 15, wherein the plurality of data elements represent all of the products purchased by consumers using a payment cards issued by the issuer.

17. The system of claim 15, wherein the plurality of data elements further comprise a set of data about a prior download of digital goods where the prior download originated at an online storefront of the merchant and terminated at a computing device of the consumer capable of consuming or storing the digital goods.

18. The system of claim 15, wherein the issuer purchase assistance unit further comprising a module that, using the plurality of data elements, determines a behavioral model of one or more consumers using a payment card issued by the issuer.

19. The electronic communication protocol of claim 15, wherein the issuer purchase assistance unit further comprising a module that determines, using the plurality of data elements, a monetary value of the interchange fees received for the purchases of good by consumers using a payment card issued by the issuer and apportioning the monetary value to the merchants that sold the good to the consumers using a payment card issued by the issuer.

20. An electronic transaction system between an issuer of payments cards and merchants accepting the cards of the issuer for purchases of goods and services by consumers, the system comprising:
    a merchant purchase assistance unit;
    an issuer purchase assistance unit capable of being in communication with the merchant purchase assistance unit using a data exchange helper protocol that is separate from a communications channel and protocol used for authorization and settlement of card payments between the merchant and the issuer; and the merchant purchase assistance unit further comprising a module that identifies information about a purchase at the merchant for a product using a debit card issued by the issuer and a module that inquires, upon request by the merchant, about a current balance of the debit card.

21. The system of claim 20, wherein the merchant purchase assistance unit further comprises a module that requests a debit card balance verification from the issuer prior to attempting the aggregation of multiple transactions.

22. The system of claim 20, wherein the inquiry module further comprises a debit card balance inquiry commands further comprises one or more data elements specifying a monetary amount to be reserved by the issuer in the account of the cardholder for a certain period of time.

* * * * *